United States Patent
Fujishiro

(10) Patent No.: US 9,432,249 B2
(45) Date of Patent: Aug. 30, 2016

(54) COMMUNICATION CONTROL METHOD AND RELAY STATION

(75) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 316 days.

(21) Appl. No.: 14/359,652

(22) PCT Filed: Nov. 25, 2011

(86) PCT No.: PCT/JP2011/077257
§ 371 (c)(1),
(2), (4) Date: May 21, 2014

(87) PCT Pub. No.: WO2013/076876
PCT Pub. Date: May 30, 2013

(65) Prior Publication Data
US 2014/0307542 A1    Oct. 16, 2014

(51) Int. Cl.
*H04L 12/24* (2006.01)
*H04W 76/04* (2009.01)

(52) U.S. Cl.
CPC ........ *H04L 41/0654* (2013.01); *H04W 76/045* (2013.01); *H04W 76/046* (2013.01)

(58) Field of Classification Search
None
See application file for complete search history.

(56) References Cited

U.S. PATENT DOCUMENTS

| | | | |
|---|---|---|---|
| 2004/0098622 A1 | 5/2004 | O'Neill | |
| 2004/0156346 A1 | 8/2004 | O'Neill | |
| 2011/0019532 A1* | 1/2011 | Jung | H04W 76/028 370/216 |
| 2011/0242970 A1* | 10/2011 | Prakash | H04W 76/068 370/225 |
| 2013/0010768 A1* | 1/2013 | Lee | H04W 76/046 370/336 |
| 2013/0039287 A1* | 2/2013 | Rayavarapu | H04W 76/048 370/329 |
| 2014/0328162 A1* | 11/2014 | Jeong | H04W 72/0453 370/221 |
| 2015/0207672 A1* | 7/2015 | Xu | H04W 76/027 370/221 |
| 2015/0223178 A1* | 8/2015 | Pietraski | H04L 5/001 370/252 |
| 2015/0334731 A1* | 11/2015 | Chen | H04W 36/0094 370/329 |

FOREIGN PATENT DOCUMENTS

| | | |
|---|---|---|
| EP | 1903821 A2 | 3/2008 |
| JP | 2006-524924 A | 11/2006 |

OTHER PUBLICATIONS

International Search Report; PCT/JP2011/077257; Dec. 20, 2011.
(Continued)

*Primary Examiner* — Chirag Shah
*Assistant Examiner* — Amar Persaud
(74) *Attorney, Agent, or Firm* — Studebaker & Brackett PC

(57) ABSTRACT

An M-RN has a UE function unit for establishing an RRC connection with an eNB on a backhaul link, and an eNB function unit for establishing an RRC connection with a UE on an access link. In an RRC_CONNECTED state in which an RRC connection with an eNB has been established, the UE function unit detects disconnection of the backhaul link. After detecting the disconnection of the backhaul link and before transitioning to an RRC_IDLE state in which the RRC connection with the eNB is released, the UE function unit transitions to an RRC_SEMI-IDLE state in which it keeps the RRC connection with the eNB and tries a recover of the backhaul link. While the UE function unit is in the RRC_SEMI-IDLE state, the eNB function unit performs control in order to keep the RRC connection with the UE (300).

7 Claims, 7 Drawing Sheets

(56) References Cited

OTHER PUBLICATIONS

3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TSG RAN#52; RP-110894; "New Study Item Proposal: Mobile Relay for E-UTRA"; Bratislava, Slovakia, May 31-Jun. 3, 2011.

Nokia Siemens Networks, Nokia Corporation, RLF of RN on Un Interface, R2-103067, 3GPP, May 14, 2010, paragraph 2.3.

Samsung, NTT DoCoMo Inc, Radio Link failure handling in LTE, R2-061827, 3GPP, Jun. 30, 2006, paragraph 2.

An Office Action; "Notice of Reasons for Rejection," issued by the Japanese Patent Office on Apr. 14, 2015, which corresponds to Japanese Patent Application No. 2013-545748 and is related to U.S. Appl. No. 14/359,652; with English language statement of relevance.

Huawai; "RN Recovery from Un Radio Link Failure"; 3GPP TSG RAN WG2 #69bis; R2-102009; Apr. 12-16, 2010; pp. 1-4; Beijing, China.

The extended European search report issued by the European Patent Office on Nov. 13, 2015, which corresponds to European Patent Application No. 11876231.9-1505 and is related to U.S. Appl. No. 14/359,652.

Communication pursuant to Rules 70(2) and 70a(2) EPC issued by the European Patent Office on Dec. 1, 2015, which corresponds to European Patent Application No. 11876231.9-1505 and is related to U.S. Appl. No. 14/359,652.

* cited by examiner

COMMUNICATION CONTROL METHOD AND RELAY STATION

TECHNICAL FIELD

This invention is related to communication control method and relay station, specified in 3GPP.

BACKGROUND ART

Currently, LTE (Long Term Evolution)-Advanced, which is a specification of a next generation radio communication, is developed and specified in 3GPP (3rd Generation Partnership Project), which is a standardization project of a mobile communication system.

LTE-Advanced supports a relay station, which relays between abase station and a user equipment in layer 3 level. The relay station has a user equipment function unit, which establishes a connection with the base station, and a base station function unit, which establishes a connection with the user equipment (e.g. referring NON-PATENT DOCUMENT 1). "Connection" is specified in layer 3 level, and is referred to as RRC (Radio Resource Control) Connection.

Moreover, a mobile type relay station is mentioned as a candidate for the next expansion function of LTE-Advanced (e.g. referring NON-PATENT DOCUMENT 2).

PRIOR ART DOCUMENT

Non-Patent Document

Non-patent Document 1: 3GPP TS 36.300 V10.4.0 "Evolved Universal Terrestrial Radio Access (E-UTRA) and Evolved Universal Terrestrial Radio Access Network (E-UTRAN); Overall description; Stage 2(Release 10)", June, 2011. Non-patent Document 2: 3GPP RP-110894 "New Study Item Proposal: Mobile Relay for E-UTRA", May, 2011.

SUMMARY OF THE INVENTION

By the way, a disconnection of a backhaul link occurs in the mobile type relay station easily comparing to a fixed type relay station, as the radio link with the base station (the backhaul link in layer 1 and layer 2) is unstable comparing to the fixed type relay station.

In the current specification, the procedures of the relay station for establishing and managing RRC Connection between a relay station and a base station are similar to the procedures of the user equipment for establishing and managing RRC Connection. Therefore, when the relay station detects the disconnection of the backhaul link in RRC CONNECTED STATE, in which it establishes RRC Connection with the base station, the relay station performs a procedure of a radio link failure (RLF). Namely, the relay station releases the RRC Connection, transitions to RRC_IDLE state and reestablishes RRC Connection with the base station.

However, in the mobile type relay station, thanks to its movement, the backhaul is sometimes recovered after the disconnection of the backhaul link. Therefore, in case the backhaul link is recovered immediately after the disconnection of the backhaul link, the procedures of RRC Connection release and establishment, like current specification, are waste in the end.

Accordingly, this invention provides communication control methods and a relay station which can properly handle the disconnection of the backhaul link in case it happens.

In order to solve the problem above, this invention has the following features.

A communication control method, in a relay station, the relay station (e.g. M-RN 200), according to this invention, comprising a user equipment function unit (e.g. UE function unit 231), which establishes a connection with a base station (e.g. eNB100) on a backhaul link, and a base station function unit (e.g. eNB function unit 232), which establishes a connection with a user equipment (e.g. UE300) on an access link, the relay station relays between the base station and the user equipment, the communication control method comprising; a step of detecting, by the user equipment function unit, a detection of the backhaul link disconnection in a connected state (e.g. RRC_CONNECTED State), in which the connection between the user equipment function unit and the base station is established, a step of transitioning, by the user equipment function unit, to a semi idle state (e.g. RRC_SEMI-IDLE State), in which the user equipment function unit keeps the connection with the base station and tries a recover of the backhaul link, after detecting the backhaul link disconnection and before transitioning to an idle state (e.g. RRC_IDLE State), in which the user equipment function unit release the connection with the base station.

According to another character of this invention, the communication control method, further comprising; a step of performing, by the base station function unit, control for keeping the connection with the user equipment while the user equipment function unit is in the semi idle state.

According to another character of this invention, the communication control method, further comprising; a step of returning, by the user equipment function unit, to the connected state, when the backhaul link recovered in the semi idle state.

According to another character of this invention, the communication control method, wherein the base station function unit continues transmitting a control signal in the step of performing control.

According to another character of this invention, the communication control method, wherein the control signal includes a reference signal used for a mobility control.

According to another character of this invention, the communication control method, further comprising; a step of recording, by the base station function unit, information for controlling a communication with the user equipment, when the user equipment function unit is in the connected state, wherein the base station function unit continues transmitting the control signal based on the recorded information in the step of recording, in the step of performing control.

According to another character of this invention, the communication control method, wherein the user equipment function unit transitions to the semi idle state, when the user equipment unit detects the disconnection of the backhaul link and does not recover in a predetermined time period in the step of transitioning.

According to another character of this invention, the communication control method, wherein the user equipment function unit transitions to the semi idle state, when the user equipment function unit detects the disconnection of the backhaul link and cannot execute handover, in the step of transitioning.

According to another character of this invention, the communication control method, further comprising; a step of transmitting, by the base station function unit, information for extending a time from detecting the disconnection of the access link to deciding as a radio link failure.

A relay station, according to this invention, comprising; a user equipment function unit, which establishes a connection with a base station on a backhaul link, a base station function unit, which establishes a connection with a user equipment on an access link, wherein the relay station relays between the base station and the user equipment, wherein the user equipment function unit transitions to a semi idle state in which the user equipment function unit keeps the connection with the base station and tries a recover of the backhaul link, after detecting the backhaul link disconnection in a connected state, in which the connection with the base station is established, and before transitioning to an idle state, in which the connection with the base station is released.

According to another character of this invention the relay station according to Claim 10, wherein the base station function unit performs control for keeping the connection with the user equipment while the user equipment function unit is in the semi idle state.

DESCRIPTION OF THE EMBODIMENTS

The embodiment of this invention is explained referring figures. The mobile communication system according to this embodiment is configured based on LTE-Advanced specified in 3GPP.

[Summary of Embodiments]

The embodiment is related to a mobile type relay station (Mobile Relay Node:M-RN)200 which relays a base station (evolved Node-B:eNB)100 and a user equipment (User Equipment:UE)300. M-RN200 comprises UE function unit231, which establishes RRC Connection with eNB100 on a backhaul link, and eNB function unit232, which establishes RRC Connection with UE300 on an access link.

UE function unit231 detects a disconnection of the backhaul link in RRC_CONNECTED state, in which UE function unit231 establishes RRC Connection with eNB100. And UE function unit231 transitions to RRC_SEMI-IDLE state, in which UE function unit231 tries a recover of the backhaul link with keeping RRC Connection with eNB100, after detecting the backhaul link disconnection and before transitioning to RRC_IDLE state, in which RRC Connection with eNB100 is released.

eNB function unit232 performs a control for keeping RRC Connection with UE300, while UE function unit231 is in RRC_SEMI-IDLE state.

[First Embodiment]

Figure 1:
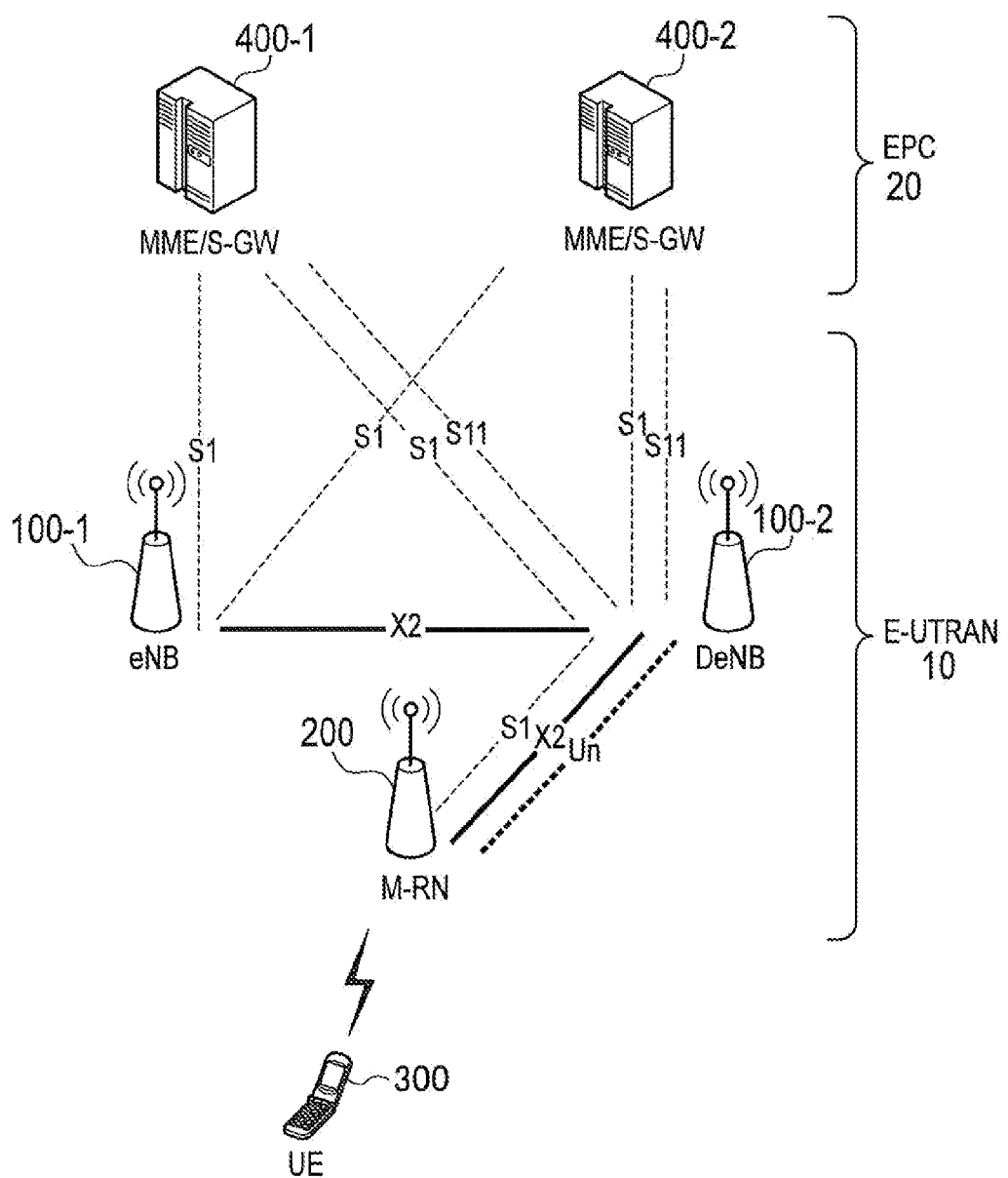
FIG. 1 This figure is an overall structure figure of the mobile communication system according to the first embodiment and the second embodiment.

FIG. 1 is an overall structure figure of the mobile communication system. As it is shown in FIG. 1, the mobile communication system according to this embodiment comprises eNB100 (eNB100-1 and DeNB100-2), M-RN200, UE300 and MME/S-GW400 (MME/S-GW400-1 and 400-2). In this embodiment, M-RN200 corresponds to 3GPP Type1 Relay (i.e. RN has a unique cell ID).

MME/S-GW400 forms EPC (Evolved Packet Core) 20, LTE core network. MME manages a cell UE300 camping on, and is configured to perform various mobility management to UE300. S-GW is configured to perform forwarding control of user data, which UE300 sends and receives.

eNB100 and M-RN200 forms E-UTRAN10, LTE radio access network. DeNB100-2 is eNB100 accommodating (serving) M-RN200. eNB100 and M-RN200 forms one or plural cells. A cell is a minimum unit of a radio communication area. eNB100 and M-RN200 transit a reference signal for distinguishable a cell by broadcast, permanently. UE300 accesses to the cell formed by eNB100 or M-RN200 and is accommodated to the cell.

Note, X2 interface is specified between eNB100 and eNB100, S1 interface is specified between eNB100 and MME/S-GW400, Uu interface is specified between M-RN200 and UE300. S11 interface is specified between DeNB100-2 and MME/S-GW400. S1 interface, X2 interface and Un interface are specified between DeNB100-2 and M-RN200.

Figure 2:
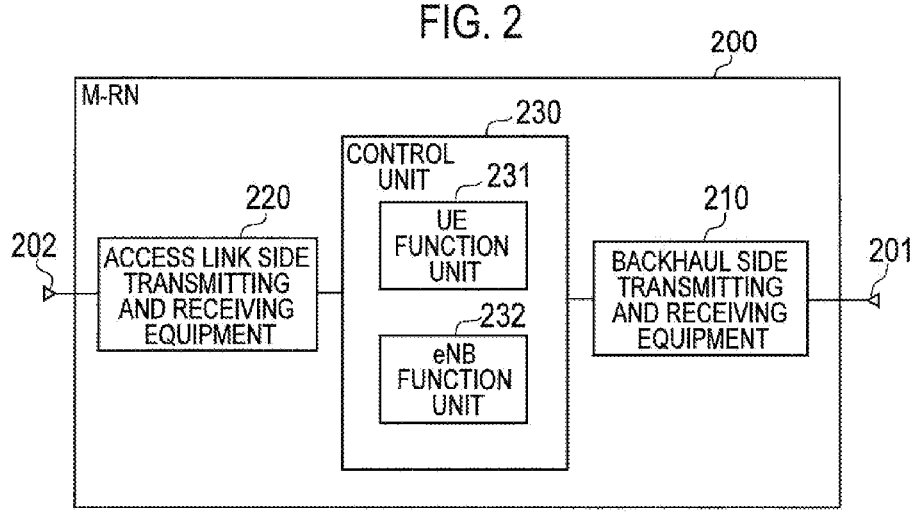
FIG. 2 This figure is a block diagram of M-RN according to the first embodiment and the second embodiment.

Next, a configuration of M-RN200 is explained. FIG. 2 is a block diagram of M-RN200. As it is shown in FIG. 2, M-RN200 comprises an antena201, a backhaul side transmitting and receiving equipment210, an antena202, an access link side transmitting and receiving equipment220, and a control unit230.

The antena201 is used for transmitting and receiving radio signals to/from eNB100 (DeNB100-2). The backhaul side transmitting and receiving equipment210 is configured by a radio frequency (RF) circuit, a baseband (BB) circuit and so on, and transmits and receives radio signals via the antena201 to/from eNB100(DeNB100-2).

The antena202 is used for transmitting and receiving radio signals to/from UE300. The access link side transmitting and receiving equipment220 is configured by a radio frequency (RF) circuit, a baseband (BB) circuit and so on, and transmits and receives radio signals via the antena202 to/from UE300.

The control unit 230 is configured by processors and memories and so on, performs various control in M-RN200. The control unit 230 includes UE function unit231 and eNB function unit232.

Regarding downlink, after demodulating and decoding (etc.) user data received from DeNB100-2, UE function unit231 transfers the user data to eNB function unit232. eNB function unit232 performs a control for transmitting the user data to UE300, in the same way as the procedure of eNB100.

Regarding uplink, after demodulating and decoding (etc.) user data received from UE300, eNB function unit232 transfers the user data to UE function unit231. UE function unit231 performs a control for transmitting the user data to DeNB100-2, in the same way as the procedure of UE300.

UE function unit231 mainly performs processes of each layer, layer 1 to layer 3 related to Un interface.

Layer1 is physical (PHY) layer. Layer2 includes MAC (Media Access Control) sublayer, RLC (Radio Link Control) sublayer and PDCP (Packet Data Convergence Protocol) sublayer. Here, RLC sublayer manages a radio link (i.e. backhaul link) with DeNB100-2. Layer3 includes RRC sublayer. RRC sublayer manages RRC Connection with DeNB100-2 and performs mobility control, QoS control, security control and so on. The mobility control means handover control and cell reselection control.

In this way, RLC sublayer manages the backhaul link with DeNB100-2. RRC sublayer manages RRC Connection which is established over the backhaul link. A state, RRC Connection is established with DeNB100-2, is referred to as RRC_CONNECTED state (connected state). A state, RRC Connection with DeNB100-2 is released, is referred to as RRC_IDLE state (idle state). Please refer for instance "4.2.1 UE states and state transitions including inter RAT" in 3GPP TS 36.331 V10.3.0 about the details of RRC_CONNECTED state and RRC_IDLE state.

In this embodiment, in addition to RRC_CONNECTED state and RRC_IDLE state, RRC_SEMI-IDLE state (semi idle state) is newly specified in UE function unit231. The details of RRC_SEMI-IDLE state are described later.

eNB function unit220 has the same functions of eNB100, and performs processes related to X2 interface, S1 interface and Uu interface. Please refer "4.7.3 S1 and X2 user plane aspects" and "4.7.4 S1 and X2 control plane aspects" in NON PATENT DOCUMENT1 regarding the processes related to X2 interface and S1 interface.

eNB function unit220 performs processes of each layer, layer1 to layer3 related to Uu interface. Layer1 is physical (PHY) layer. Layer2 includes MAC (Media Access Control) sublayer, RLC (Radio Link Control) sublayer and PDCP (Packet Data Convergence Protocol) sublayer. Here, RLC sublayer manages a radio link (i.e. access link) with UE300. Layer3 includes RRC sublayer. RRC sublayer manages RRC Connection with UE300 and performs mobility control, QoS control, security control and so on.

Figure 3:
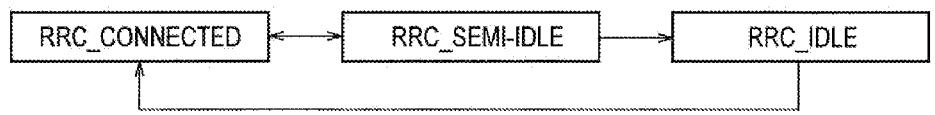
FIG. 3 This figure is a figure for explaining RRC_SEMI-IDLE state according to the first embodiment (case1).
Figure 4:
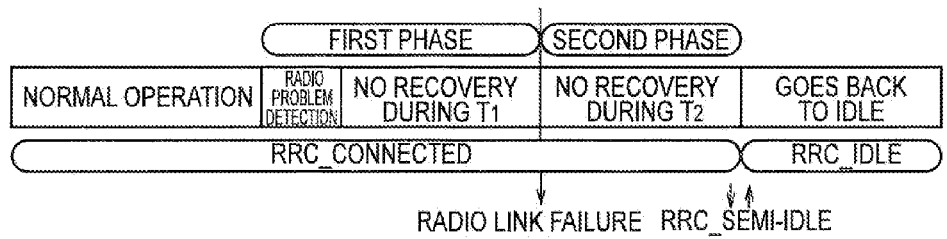
FIG. 4 This figure is a figure for explaining RRC_SEMI-IDLE state according to the first embodiment (case2).

Next, RRC_SEMI-IDLE state is explained. FIG. 3 and FIG. 4 are figures for explaining RRC_SEMI-IDLE state according to present embodiment.

As it is shown in FIG. 3, in addition to the two states currently specified in the specification, RRC_CONNECTED and RRC_IDLE, RRC_SEMI-IDLE state is specified, in UE function unit231 (in RRC sublayer). RRC_CONNECTED state and RRC_SEMI-IDLE state can be transitioned bidirectionally. On the other hand, the transition from RRC_SEMI-IDLE state to RRC_IDLE state is unidirectional. The transition from RRC_IDLE state to RRC_CONNECTED state is unidirectional, and does not pass RRC_SEMI-IDLE state.

As it is shown in FIG. 4, in RRC_CONNECTED state, UE function unit231 transitions to RRC_SEMI-IDLE state, after RLF procedure (Period of $T_1$ and $T_2$) due to a detection of a disconnection of a backhaul link (radio problem detection). Please refer "10.1.6 Radio Link Failure" in NON PATENT DOCUMENT1 regarding RLF procedure.

RRC_SEMI-IDLE state continues a certain period of time. RRC_SEMI-IDLE state is a state in which RRC sublayer of UE function unit231 is keeping RRC Connection with DeNB100-2 and RLC sublayer of UE function unit231 tries a recover of the backhaul link. When the backhaul link is recovered in RRC_SEMI-IDLE state, it transitions (returns) to RRC_CONNECTED state. When the backhaul link is not recovered in RRC_SEMI-IDLE state, it transitions to RRC_IDLE state.

In this way, by specifying RRC_SEMI-IDLE state, RRC Connection is not released but keeps, while the backhaul link is disconnected. And when the backhaul link is recovered in RRC_SEMI-IDLE state, it can immediately return to RRC_CONNECTED state without re-establishing (re-establishment) of RRC Connection. Specially, special subframe structure is configured in RRC sublayer between DeNB100-2 and M-RN200. However, by not releasing but keeping RRC Connection, while the backhaul link is disconnected, it does not need to reconfigure this configuration.

Note, as RRC Connection is kept but the backhaul link is disconnected in RRC_SEMI-IDLE state, it can not transmit and receive data (user data and control data) to/from DeNB100-2.

On the other hand, when eNB function unit232 stops transmitting a control signal to UE300 accommodated by M-RN200, it tries to perform. RLF procedures to reestablish RRC connection with other cell, as the UE300 in RRC_CONNECTED state can not synchronize with M-RN200.

However, considering the possibility of recovering the backhaul link, it is desirable that UE 300 in RRC_CONNECTED state in the cell of M-RN200 keep RRC_CONNECTED state in a certain period of time.

And, when the transmission of the control signal from M-RN200 stops, UE300 in RRC_IDLE state in the cell of M-RN200 performs cell reselection to other cell. Here, considering the possibility of recovering the backhaul link, it is desirable that UE 300 in RRC_IDLE state in the cell of M-RN200 should not perform cell reselection in a certain period of time.

Therefore, in this embodiment, eNB function unit232 performs a control for keeping RRC Connection with UE300, while UE function unit231 is in RRC_SEMI-IDLE state. In detail, eNB function unit232 continues to transmit the control signals while UE function unit231 is in RRC_SEMI-IDLE state. The control signal is transmitted by broadcast.

The control signals include a synchronization signal for establishing synchronization, a reference signal for a measurement (UE measurement) for the mobility control, a master information block (MIB) including system information, and a system information block (SIB). MIB is transmitted on physical broadcast channel (PBCH), and SIB is transmitted on physical downlink shared channel (PDSCH).

eNB function unit232 tries not to stop transmitting these control signals, when UE function unit231 transitions to RRC_SEMI-IDLE state. In detail, eNB function unit232 records information for transmitting the control signals, when UE function unit231 is RRC_CONNECTED state. And eNB function unit232 continue transmitting the control signals using the recorded information, when UE function unit231 is in RRC_SEMI-IDLE state.

In this way, M-RN200 continues transmitting the control signals in RRC_SEMI-IDLE state in order to keeping RRC Connection in the access link side, even when the backhaul link is lost. From this, it is possible to repress unnecessary handover and cell reselection, by modifying the specification of M-RN200. And the modification of UE300 specification is not necessary.

Note, in RRC_SEMI-IDLE state, UE300 is in normal RRC_CONNECTED state but UE300 is not allocated a resource for user data forwarding.

eNB function unit232 stop transmitting these control signals, when UE function unit231 transitions from RRC_SEMI-IDLE state to RRC_IDLE state.

Figure 5:
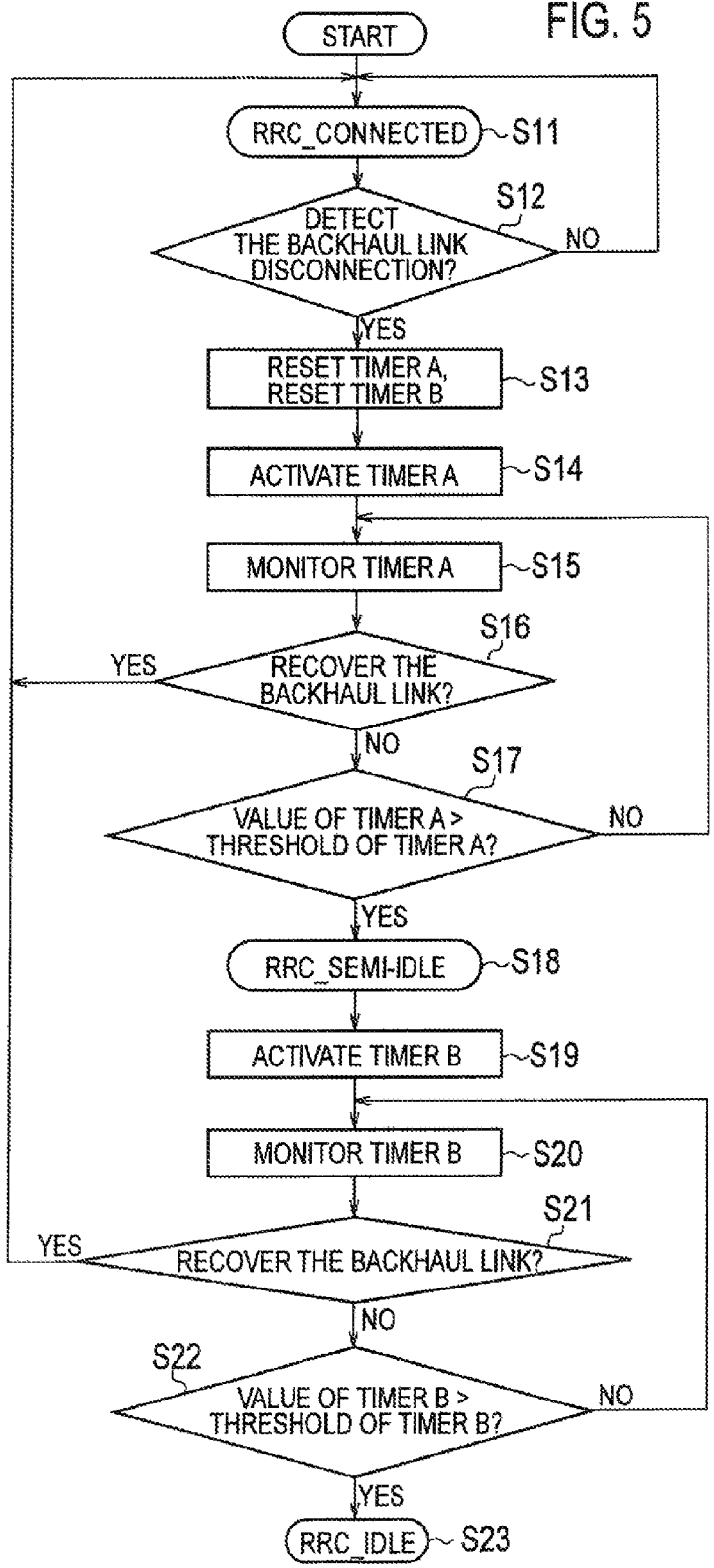
FIG. 5 This figure is an operational flow chart according to M-RN in the first embodiment.

Next, the operation of M-RN200 is explained. FIG. 5 is an operational flow chart of M-RN200 according to this embodiment.

In this operational flow, timer A is a timer for counting a period between $T_1$ and $T_2$ shown in FIG. 4 by UE function unit231. TimerB is a timer for counting a period for continuing RRC_SEMI-IDLE state by UE function unit231.

In this embodiment, a threshold value of timer B (i.e. a period continuing RRC_SEMI-IDLE state) is configured longer than a threshold value of timerA (i.e. a period between $T_1$ and $T_2$ shown in FIG. 4).

As it is shown in FIG. 5, UE function unit231 is RRC_CONNECTED state in step S11.

In step S12, UE function unit231 confirms whether the backhaul link is disconnected or not. When it does not detect the backhaul link (stepS12; No), the process returns to step S11. On the other hand, when it detects the backhaul link disconnection (stepS12; Yes), the process goes to step S13.

In stepS13, UE function unit231 reset timer A and timer B.

In step S14, UE function unit231 activates timer A.

In step S15, UE function unit231 monitors timer A.

In step S16, UE function unit231 confirms whether the backhaul link is recovered or not. When the backhaul link is recovered (step S16; Yes), the process returns to step S11. On the other hand, when the backhaul link is not recovered (stepS16; No), the process goes to step S17.

In stepS17, UE function unit231 confirms whether the value of timer A exceeds the threshold value of timer A. When the value of timer A exceeds the threshold value of timer A (stepS17; Yes), the process goes to stepS18. On the other hand, the value of timer A does not exceed the threshold value of timer A (stepS17; No), the process returns to step S15.

In step S18, UE function unit231 transitions from RRC_CONNECTED state to RRC_SEMI-IDLE state.

In stepS19, UE function unit231 activates timer B.

In stepS20, UE function unit231 monitors timer B.

In stepS21, UE function unit231 confirms whether the backhaul link is recovered or not. When the backhaul link is recovered (stepS21; Yes), the process returns to step S11. Then, UE function unit231 transitions (returns) from RRC_SEMI-IDLE state to RRC_CONNECTED state. On the other hand, when the backhaul link is not recovered (stepS21; No), the process goes to step S22.

In step S22, UE function unit231 confirms whether the value of timer B exceeds the threshold value of timer B. When the value of timer B exceeds the threshold value of timer B (stepS22; Yes), the process goes to step S23. On the other hand, when the value of timer B does not exceed the threshold value of timer B (stepS22; No), the process returns to step S20.

In step S23, UE function unit231 transitions from RRC_SEMI-IDLE state to RRC_IDLE state. Note, when it transitions to RRC_IDLE state once, the procedure of RRC Connection re-establishment (RRC Connection re-establishment) is required. The procedure is the same as the current specification.

Figure 6:
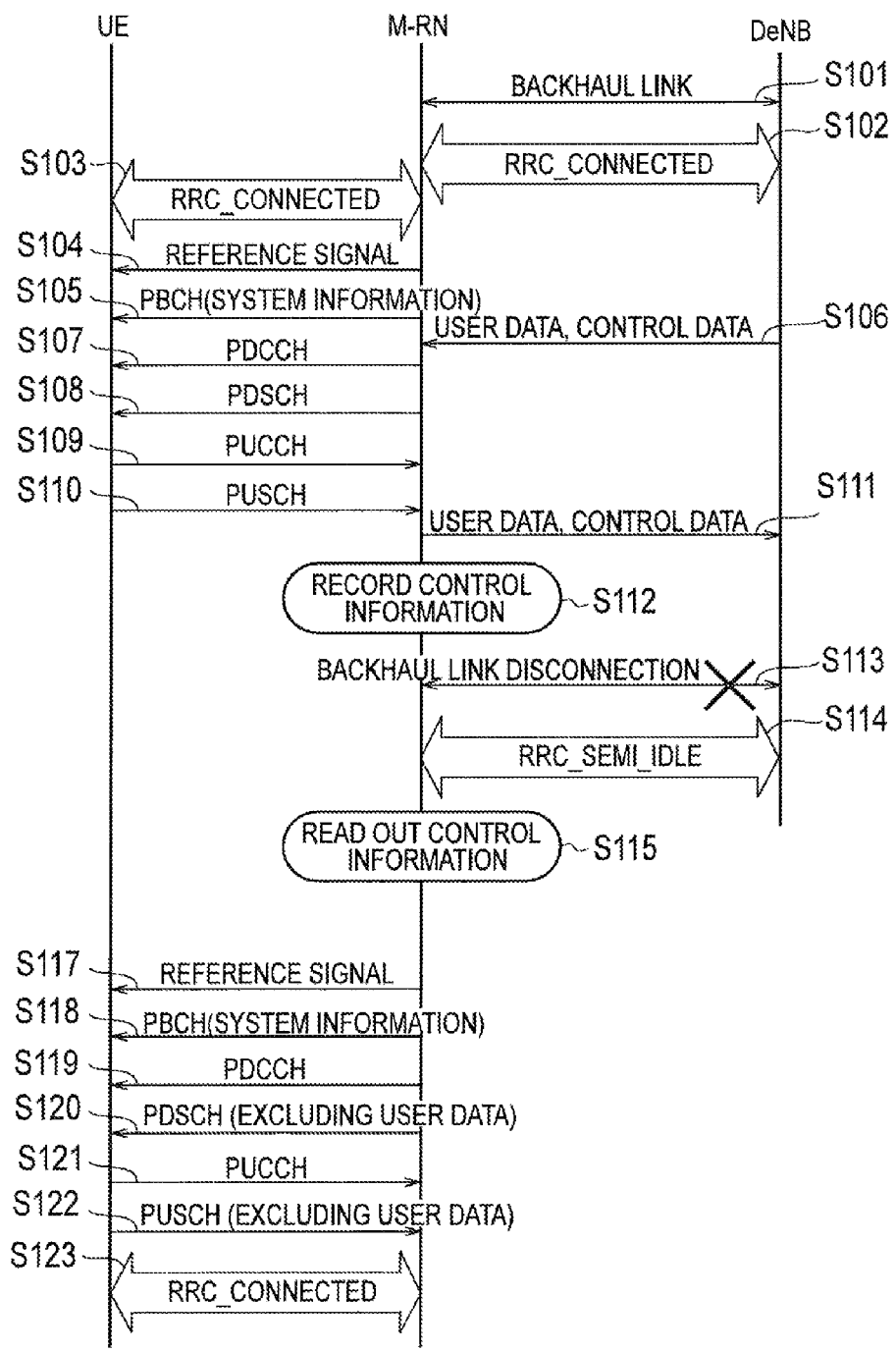
FIG. 6 This figure shows a case that M-RN transitions to RRC_CONNECTED state.
Figure 7:
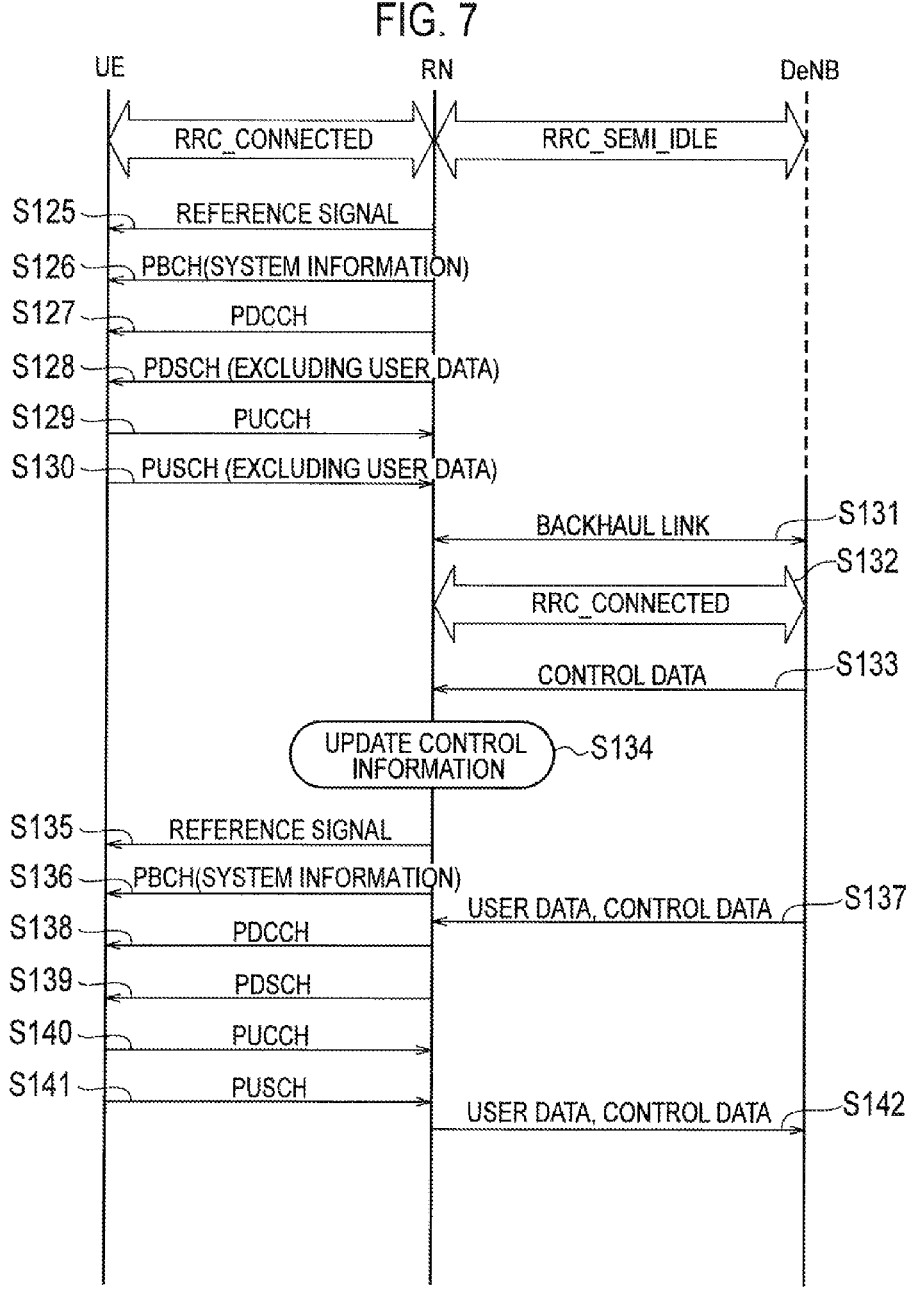
FIG. 7 This figure shows a case that M-RN transitions from RRC_SEMI-IDLE state to RRC_CONNECTED state after the sequence in FIG. 6.

Next, the overall operations of the mobile communication system, mainly the operations of M-RN200 are explained using FIG. 6 and FIG. 7.

FIG. 6 shows a case that UE function unit231 of M-RN200 transitions to RRC_CONNECTED state.

As it is shown in FIG. 6, in step S101, M-RN200 configures a backhaul link with DeNB100-2.

In step S102, UE function unit231 of M-RN200 establishes RRC Connection with DeNB100-2, and transitions from RRC_IDLE state to RRC_CONNECTED state.

In step S103, UE function unit231 of M-RN200 establishes RRC Connection with UE300. UE300 transitions from RRC_IDLE state to RRC_CONNECTED state.

In step S104, eNB function unit232 of M-RN200 transmits a reference signal.

In step S105, eNB function unit232 of M-RN200 transmits SIB.

In step S106, DeNB100-2 transmits control data including resource allocation information (etc.) to M-RN200, to M-RN200 on PDCCH. And DeNB100-2 transmits user data to M-RN200 using PDSCH resource allocated to M-RN200. UE function unit231 of M-RN200 receives user data and control data from DeNB100-2.

In step S107, eNB function unit232 of M-RN200 transmits control data including resource allocation information (etc.) to M-RN200, to UE300 on PDCCH.

In step S108, eNB function unit232 of M-RN200 transmits (i.e. relays) user data from DeNB100-2 to UE300 using PDSCH resource allocated to UE300.

In step S109, UE300 transmits control data including feedback information (HARQ ACK/NACK and CQI), etc. to M-RN200 on PUCCH.

In step S110, UE300 transmits user data using PUSCH resource allocated by M-RN200 to M-RN200. eNB function unit232 of M-RN200 receives user data and control data from UE300.

In step S111, UE function unit231 of M-RN200 transmits user data and control data including feedback information (HARQ ACK/NACK and CQI), etc. to DeNB100-2.

In this way, from stepS101 to stepS111, M-RN200 is a state in which the backhaul link is configured with DeNB100-2, and is in RRC_CONNECTED state. M-RN200 exchanges user data and control data with DeNB100-2. And in the access link side, M-RN200 exchanges user data and control data with UE300 in RRC_CONNECTED state.

In step S112, eNB function unit232 of M-RN200 records control information corresponding to control signal transmitted in access link side. Here, the control information means, information should be included in MIB and SIB, transmission pattern of the reference signal. And MBMS related information (SIB13) and other system information (SIB6•7•8) corresponds to the control information.

In step S113, UE function unit231 of M-RN200 detects the backhaul link disconnection.

In step S114, UE function unit231 of M-RN200 transitions to RRC_SEMI-IDLE state.

In step S115, eNB function unit232 of M-RN200 reads out control information recorded in step S112.

In step S117, eNB function unit232 of M-RN200 transits the reference signal based on the control information read out in stepS115.

In step S118, eNB function unit232 of M-RN200 transmits SIB based on the control information read out in stepS115.

In stepS119, eNB function unit232 of M-RN200 transmits control data including resource allocation information to UE300 and etc. to UE300 on PDCCH.

In stepS120, eNB function unit232 of M-RN200 transmits data other than user data (e.g. PCH (Paging Channel)) using PDSCH resource allocated to UE300 to UE.

In step S121, UE300 transmits the control data to M-RN200 on PUCCH.

In step S122, UE300 transmits data other than user data (e.g. Measurement Report) using PUSCH resource allocated by M-RN200 to M-RN200.

In this way, from step S117 to step S122, as the control signal is sent and received normally in the access link side, RRC_CONNECTED state of UE300 is kept.

FIG. 7 shows a case when UE function unit231 of M-RN200 transitions from RRC_SEMI-IDLE state to RRC_CONNECTED state after the sequence in FIG. 6. In an initial state in FIG. 7, UE300 is in RRC_CONNECTED state and UE function unit231 of M-RN200 is in RRC_SEMI-IDLE state.

As it is shown in FIG. 7, the processes from step S125 to step S130 is the same as the processes from step S117 to step S122 in FIG. 6.

In step S131, M-RN200 configures (recovers) the backhaul link with DeNB100-2.

In step S132, UE function unit231 of M-RN200 establishes RRC Connection with DeNB100-2, and transitions from RRC_SEMI-IDLE state to RRC_CONNECTED state.

In step S133, M-RN200 receives control data from DeNB100-2.

In step S134, M-RN200 updates control information based on the control data received from DeNB100-2. For example, M-RN200 updates MBMS related information (SIB13), other system information (SIB6, 7, 8), emergency earthquake notification information (SIB10, 11) and so on based on the control data received from DeNB100-2

The processes from step S135 to step S142 is the same as the processes from step S104 to step S111 in FIG. 6.

[Second Embodiment]

The second embodiment, mainly difference from the first embodiment is explained, below.

In the first embodiment, UE function unit231 of M-RN200 transitions to RRC_SEMI-IDLE state, when the backhaul link is not recovered within a certain period of time after the backhaul link disconnection is detected.

On the other hand, in this embodiment, UE function unit231 of M-RN200 transitions to RRC_SEMI-IDLE state, when the backhaul link is detected.

Figure 8:
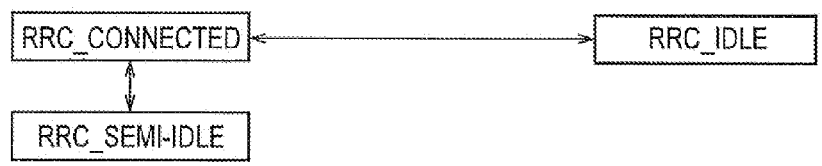
FIG. 8 This figure is a figure for explaining RRC_SEMI-IDLE state according to the second embodiment (case1).
Figure 9:
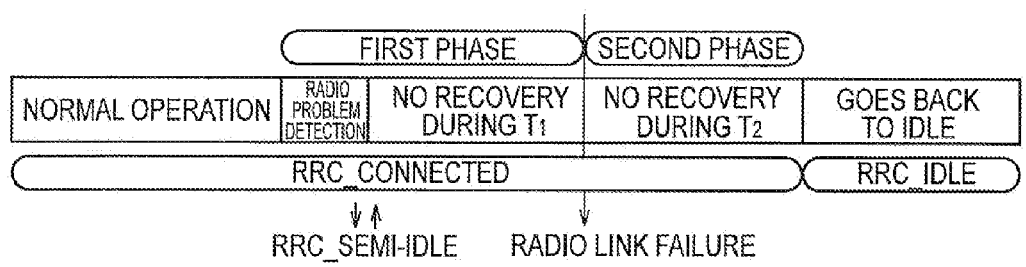
FIG. 9 This figure is a figure for explaining RRC_SEMI-IDLE state according to the second embodiment (case2).

FIG. 8 and FIG. 9 are figures for explaining RRC_SEMI-IDLE state according to this embodiment.

As it is shown in FIG. 8, RRC_SEMI-IDLE state is specified in UE function unit231 (RRC sublayer of UE function unit231), in addition to the two states, RRC_CONNECTED state and RRC_IDLE state. RRC_CONNECTED state and RRC_IDLE state can be transitioned bilaterally. RRC_CONNECTED state and RRC_SEMI-IDLE state can be transitioned bilaterally.

As it is shown in FIG. 9, UE function unit231 detects backhaul link disconnection (radio problem detection) and transitions to RRC_SEMI-IDLE state. RRC_SEMI-IDLE state, similar to the first embodiment, is a state, in which RRC sublayer of UE function unit231 keeps RRC Connection with DeNB100-2 and RLC sublayer of UE function unit231 tries a recovery of the backhaul link. When the backhaul link is recovered in RRC_SEMI-IDLE state, UE function unit231 transitions (returns) to RRC_CONNECTED state. When the backhaul link is not recovered in RRC_SEMI-IDLE state, UE function unit231 transitions to RRC_CONNECTED state and starts RLF procedure.

Figure 10:
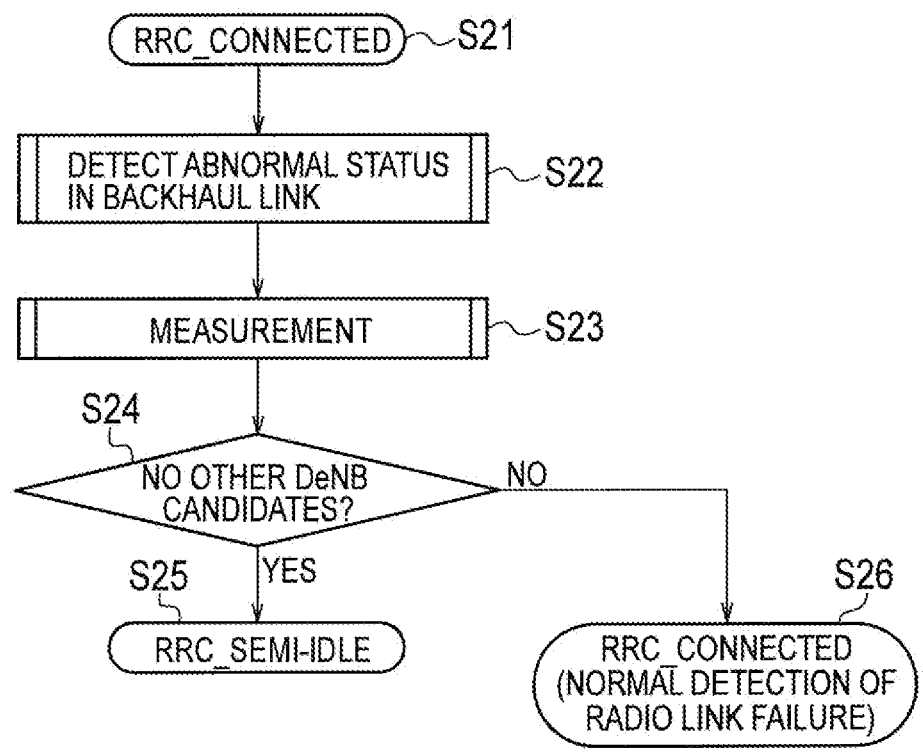
FIG. 10 This figure is an operational flow chart according to M-RN in the second embodiment.

Next, the operation of M-RN200 is explained. FIG. 10 is an operational flowchart according to this embodiment. Here, the difference from the first embodiment is shown.

As it is shown in FIG. 10, UE function unit231 is RRC_CONNECTED state in step S21.

In step S22, UE function unit231 detects the backhaul link disconnection.

In step S23, UE function unit231 performs a measurement for handover. In detail, UE function unit231 receives a synchronization signal and reference signal from cell other than the serving cell (cell of DeNB100-2). If the receiving power of the reference signal is satisfactory, UE function unit231 set the cell as a handover candidate.

When there is no handover candidate from the measurement result in step S23, UE function unit231 transitions to RRC_SEMI-IDLE state. On the other hand, when there are handover candidates (stepS24; No), UE function unit231 keeps in RRC_CONNECTED state.

[Other Embodiment]

As described above, the present invention is described by each embodiment, but it is not to be understood that the description and the figures comprising this disclosure should not be understand to limiting the present invention. From this disclosure, the various alternatives, embodiment and operation techniques are clarified for skilled persons in the art.

For example, when UE function unit231 transitions to RRC_SEMI-IDLE state, eNB function unit232 transmits information for extending the time period from detecting the access link disconnection to deciding RLF ($T_1$ in FIG. 4 and FIG. 9).

As the access link disconnection due to the backhaul link disconnection occurs easily to UE300 accommodated to M-RN200, the timer value (or counter, etc.) $T_1$ is increased appropriately by SIB from M-RN200. So the time for keeping RRC_CONNECTED state after detecting the access link disconnection (Radio Problem) can get longer.

As a result, it is possible to keep RRC_CONNECTED state after the backhaul link recover to the access link recover, and it is possible to gain the similar effect to that of RRC_SEMI-IDLE. This $T_1$ is specified as T310 in the specification. And $T_1$ is included in RLF-TimersAndConstants IE in RadioResourceConfigDedicated in RRC Connection Reconfiguration message.

Note, as the maximum value of T310 is 2 second in the current specification, it is preferable that the configuration value should be extended to the appropriate configuration value (about from 30 second to 180 second: the backhaul link disconnection in a tunnel is assumed).

Note, RRC Connection Reconfiguration is performed at the time of starting RRC Connection and performing handover processing. When the node connecting to is M-RN200 at the time of starting RRC Connection, the node connecting to, to which RRC Connection Reconfiguration is transmitted, knows whether the configuration of T310 is modified or not. So it is no problem (as the node knows its own state).

And, when a state is to be RRC_CONNECTED once, it is possible to transmit RRC Connection Reconfiguration to UE300, due to changing the state of M-RN200. There are no issues excluding the issue of signaling overhead, which is caused by controlling plural of UE300 simultaneously and individually (Essentially, if it is possible to broadcast by SIB, etc., the overhead can be reduced. Note, it is basic understanding that IE of SIB should be limited to necessity minimum).

On the other hand, in case of handover, when a handover target (Target Node) is M-RN200, Target Node should transfers T310 value expected by Target Node to Source Node by any procedures in advance. In this point, an extension of a message specification, such as X2 Handover Request Acknowledge, etc. is required.

INDUSTRIAL APPLICABILITY

As described above, the communication control method and the relay station can perform proper processing, when the backhaul link disconnection occurs. So it is useful in the field of the radio communication.

The invention claimed is:

1. A communication control method, in a relay station, the relay station comprising a user equipment function unit, which establishes a connection with a base station on a backhaul link, and a base station function unit, which establishes a connection with a user equipment on an access link, the relay station relays between the base station and the user equipment, the communication control method comprising;
   detecting, by the user equipment function unit, a detection of the backhaul link disconnection in a connected state, in which the connection between the user equipment function unit and the base station is established;
   transitioning, by the user equipment function unit, to a semi idle state, in which the user equipment function unit keeps the connection with the base station and tries a recover of the backhaul link, after detecting the backhaul link disconnect on and before transitioning to an idle state, in which the user equipment function unit release the connection with the base station;
   performing, by the base station function unit, control for keeping the connection with the user equipment while the user equipment function unit is in the semi idle state; and
   recording, by the base station function unit, information for controlling a communication with the user equipment, when the user equipment function unit in the connected state, wherein
   the base station function unit continue transmitting the control signal based on the recorded information in the step of recording, in the step of performing control.

2. The communication control method according to claim 1, further comprising;
   returning, by the use equipment function unit, to the connected state, when the backhaul link recovered in the semi idle state.

3. The communication control method according to claim 1, wherein the control signal includes a reference signal used for a mobility control.

4. The communication control method according to claim 1, wherein
   the user equipment function unit transitions to the semi idle state, when the user equipment unit detects the disconnection of the backhaul link and does not recover in a predetermined time period in the step of transitioning.

5. The communication control method according to claim 1, wherein
   the user equipment function unit transitions to the semi idle state, when the user equipment function unit detects the disconnection of the backhaul link and cannot execute handover, in the step of transitioning.

6. The communication control method according to claim 1, further comprising;
   transmitting, by the base station function unit, information for extending a time from detecting the disconnection of the access link to deciding as a radio link failure.

7. A relay station, comprising;
   a user equipment function unit, which establishes a connection with a base station on a backhaul link; and
   a base station function unit, which establishes a connection with a user equipment on an access link, wherein
   the relay station relays between the base station and the user equipment,
   the user equipment function unit transitions to a semi idle state in which the user equipment function unit keeps the connection with the base station and tries a recover of the backhaul link, after detecting the backhaul link disconnection in a connected state, in which the connection with the base station is established, and before transitioning to an idle state, in which the connection with the base station is released, and
   the base station function unit;
      performs control for keeping the connection with the user equipment while the user equipment function unit is in the semi idle state,
      records information for controlling a communication with the user equipment, when the user equipment function unit is in the connected state, and
      continues transmitting the control signal based on the recorded information in the step of recording, with performing said control.

* * * * *